April 9, 1963   A. E. BAAK   3,084,900
GAS VALVE
Filed Dec. 22, 1959   2 Sheets-Sheet 1
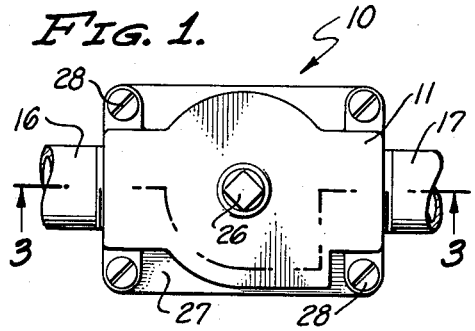
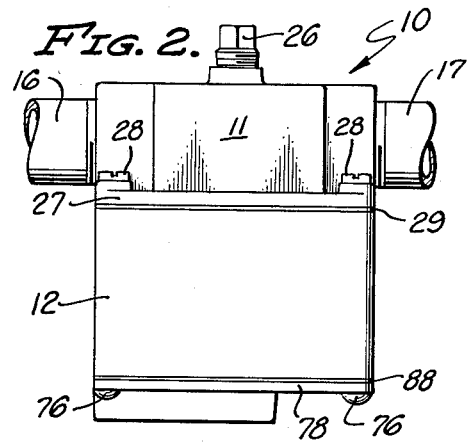
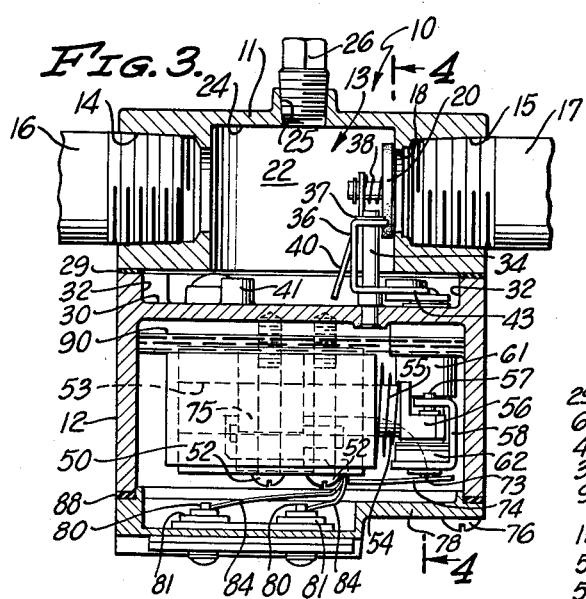
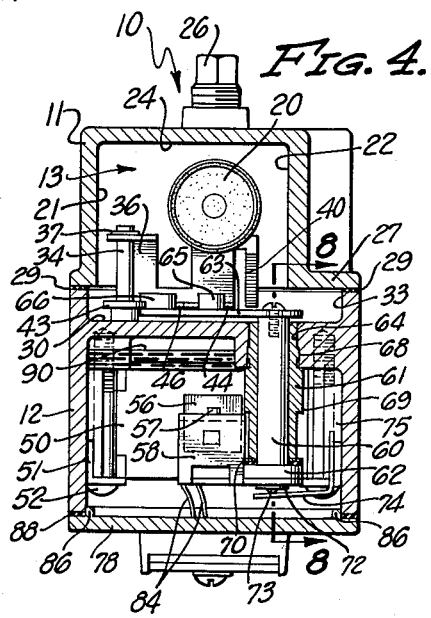
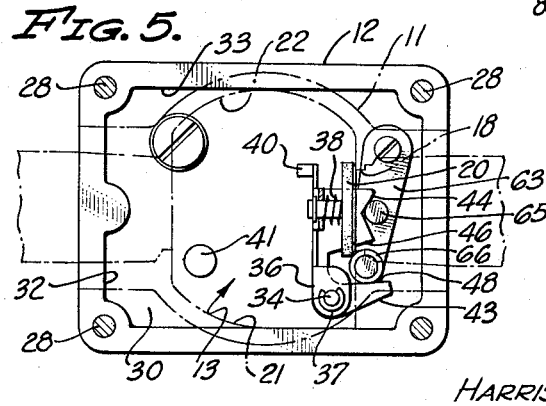
INVENTOR
ALBERT E. BAAK
BY HIS ATTORNEYS
HARRIS, KIECH, RUSSELL & KERN April 9, 1963
A. E. BAAK
3,084,900
GAS VALVE
Filed Dec. 22, 1959
2 Sheets-Sheet 2
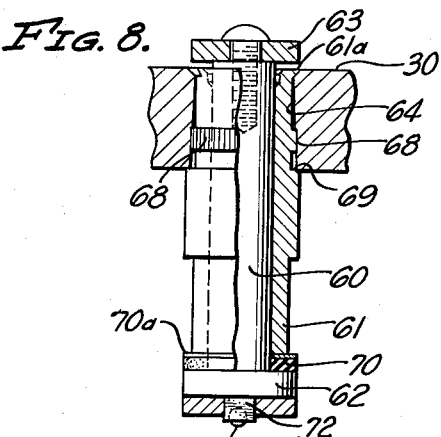
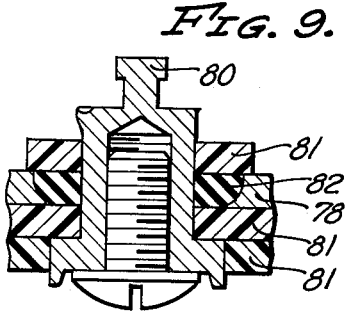
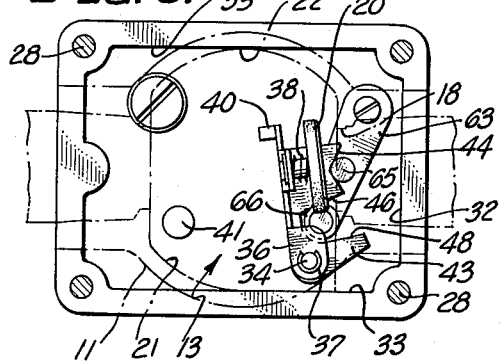
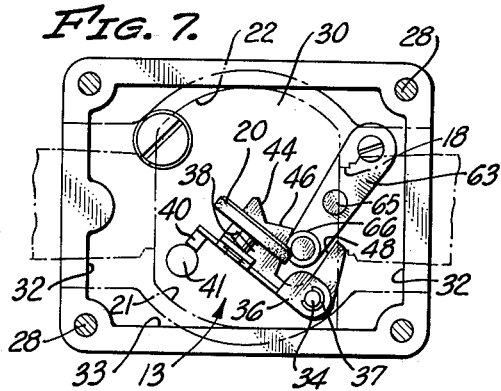
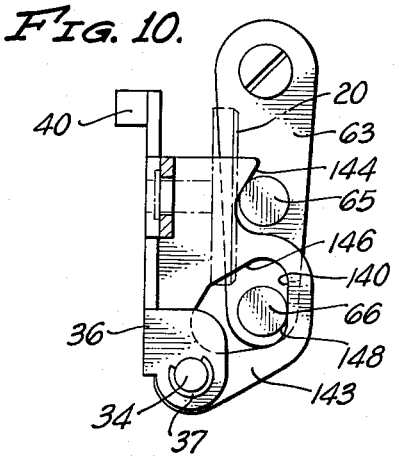
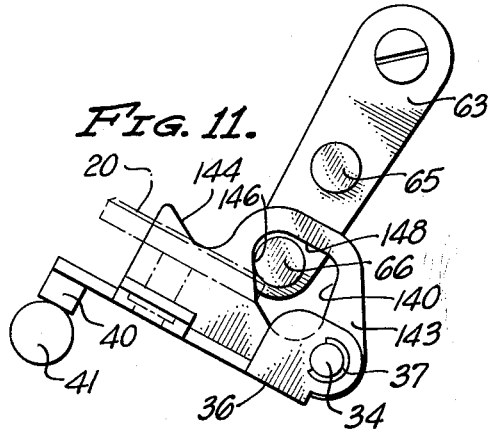
INVENTOR
ALBERT E. BAAK
BY HIS ATTORNEYS
HARRIS, KIECH, RUSSELL & KERN

United States Patent Office 3,084,900
Patented Apr. 9, 1963

3,084,900
GAS VALVE
Albert E. Baak, 640 Ocampo Drive, Pacific
Palisades, Calif.
Filed Dec. 22, 1959, Ser. No. 861,233
11 Claims. (Cl. 251—54)

This invention relates to fluid control devices and more particularly to a valve that is rapidly and positively actuable between full flow and shutoff conditions.

More specifically, the invention at hand relates to the control of a fluid fuel enroute to the burner of a gas furnace or the like. While for the purposes of this discussion the control device will be applied to the operation of a valve for controlling fluid fuel, it is to be understood that in its broader aspects it is not to be limited to such use but may be employed for all similar purposes.

Whenever a device co-operates with a valve for the control of fluid fuel enroute to the main burner of a gas furnace certain elements must be considered which are presently critical factors in the development of efficient co-operation. The valve to be used in such control must have ample capacity to supply the requirements of a main burner. It is found that the capacity of a valve is determined by the area of the opening at the valve seat and the maximum distance the valve member can be removed from its valve seat allowing fluid to flow with minimum impedance. The force required for such movement acts against the sealing force of the valve member exerted by the fluid being controlled.

It is, accordingly, one of the objects of this invention to provide a unique linkage arrangement between the operator and the valve member which will provide a force capable of operating a valve where the size of the valve member is relatively large and the distance the valve is displaced when opened is relatively great.

Another object of this invention is to provide a high initial torque at the valve member for overcoming the static friction of the moving parts and for overcoming fluid pressure when opening or breaking the valve seal. Another object in this connection is to provide a lesser secondary force that moves the valve member to its final open position at a higher rate once the high initial resistance has been overcome.

A further object of this invention is to provide a fluid control device having a valve chamber and an electromagnetic operator housing sealed from the valve chamber, the operator housing providing therewithin a solenoid magnet with a movable magnetic core, the operator housing further being partially filled with oil for keeping the moving parts lubricated, thereby eliminating, to a great degree, wear and undesirable noise, and whereby heat generated in the solenoid coil will be dissipated by the surrounding oil medium.

A more specific object of this invention is to provide a valve chamber having a movable valve means therein, an electromagnetic operator housing sealed from the valve chamber, the operator housing being partially filled with oil and providing therewithin a solenoid magnet with a movable magnetic core, and a unique linkage arrangement extending between the valve means and the movable magnetic core including a lever arm, extending from the movable magnetic core and secured to the bottom of a rotatable sealed drive shaft positioned vertically and connecting the interiors of the valve chamber and the operator housing, and a torque arm rigidly connected to the top of the rotatable drive shaft and providing a cam engagement pin and a cam engagement roller spaced therealong for engagement with a cam flange which forms a portion of the valve means, such engagement producing movement of the valve means upon rotation of the sealed drive shaft, the rotation of which is initiated by the movable magnetic core in response to the energizing of the solenoid magnet.

A further object of this invention is to provide a unique linking arrangement between the valve member and the movable magnetic core of the solenoid magnet, the linkage including a drive shaft connecting the interiors of the valve chambers and the operator housing, the shaft being rotatable within a mounting jacket secured in a wall separating the valve chamber and the operator housing, and a spring means engaging the bottom of the drive shaft to spring load it against the mounting jacket, the urging together of the aforementioned portions providing the necessary seal between the valve chamber and the operator housing.

Another object of this invention is to provide the valve means with a high amplification of closing power wherein the valve member is returned to the valve seat with a switch forceful stroke as a result of the unique linkage arrangement and the fluid pressure exerted thereon when the valve member moves toward the valve seat obstructing the normal fluid flow pattern.

The invention also comprises novel details of construction and novel combinations and arrangements of parts, which will more fully appear in the course of the following description. The drawing merely shows and the description merely describes a preferred embodiment of the present invention, which is given by way of illustration or example.

In the drawings:

FIG. 1 is a top plan view of a preferred embodiment of the invention;

FIG. 2 is a side plan view of a preferred embodiment of the invention;

FIG. 3 is an enlarged sectional view taken along the arrowed line 3—3 of FIG. 1;

FIG. 4 is a sectional view taken along the arrowed line 4—4 of FIG. 3;

FIG. 5 is a top view with the gas chamber removed and depicting the valve member in closed position;

FIG. 6 is a view similar to FIG. 5, with the valve member depicted in an intermediate position;

FIG. 7 is a view similar to FIG. 6, with the valve member depicted in its wide open position;

FIG. 8 is an enlarged partially sectional view of the drive shaft portion of the linkage means taken along the line 8—8 of FIG. 4;

FIG. 9 is an enlarged sectional view of one of the insulated electrical terminals;

FIG. 10 is a plan view of an alternative embodiment of a portion of the linkage arrangement depicting the valve member in closed position; and FIG. 11 is a plan view similar to FIG. 10, with the valve member depicted in its wide open position.

Referring now to the drawings, the fluid control device 10 includes a valve body 11 and an operator housing 12. The valve body 11 provides an inner valve chamber 13 having a threaded inlet port 14 and an opposed threaded outlet port 15. An inlet pipe 16 is threadedly connected with the inlet port 14 and an outlet pipe 17 is threadedly connected with the outlet port 15. Located at the mouth of the outlet port 15 is a radially inwardly directed valve seat 18 which co-operates with a disc-shaped valve member 20 for controlling the flow of fluid, such as gaseous fuel, through such valve.

The valve chamber 13 includes partially arcuate side walls 21, 22 defining a flow passage leading from the inlet port 14 to direct the incoming fluid in a curved flow pattern while passing through the valve chamber 13. When the valve member 20 is in open position and displaced a distance from the valve seat 18 (see FIG. 7) at an angle of about 45° with respect to the initial path of the fluid flow a high volume of fluid flow is obtained since the fluid, conforming to the flow pattern as defined by the side walls 21, 22, is impeded very little in substantially by-passing the inclined valve member 20. It will be noted, however, that the valve member 20, when in closed position and co-operating with the valve seat 18 at the outlet port 15, is enhanced in its sealing action by the pressure of the controlled fluid which is exerted over its entire area. Further, the valve chamber 13 has a top wall 24 and an open bottom, the top wall 24 providing a threaded opening 25 for receiving a threaded plug 26.

The valve body 11 provides a peripheral mounting flange 27 which is secured by screws 28 to the operator housing 12, a gasket seal 29 being placed therebetween to prevent leakage.

The operator housing 12 is substantially rectangular in cross section and provides a recessed top member 30, and end walls 32 and side walls 33 which extend upwardly above the top member 30 and engage the gasket seal 29 and receive the screws 28. Located on the top member 30 is a post 34 on which is pivotally mounted a valve support member or arm 36. A lock ring 37 is secured at the top of the post 34 to prevent the support member from slipping therefrom. The valve member 20 is connected to the support member 36 and is positioned to co-operate with the valve seat 18, a sealing force being applied to the valve member in the direction of the valve seat by a spring 38 loaded between the valve member 20 and the support member 36. Inclined rearwardly and away from the support member is a stop arm 40 provided to abut a stub member 41 formed integrally with the top member 30. The stub member 41 is provided to halt movement of the valve member 20 at an angle of about 45° with the initial direction of the fluid flow through the inlet port 14 when the valve member is being opened and thus displaced a distance from the valve seat 18.

Formed integrally with the support member 36 and extending normally thereto is a forwardly directed cam flange 43. The cam flange 43 provides a cam surface which includes an initial movement portion 44 of short length, a secondary movement portion 46 of substantially greater length than the initial movement portion, and a retractive portion 48 opposed and substantially parallel to the secondary movement portion 46.

Means for actuating the valve may be carried within the operator housing 12. In the preferred form shown herein a conventional solenoid magnet 50 is mounted therein by L-shaped brackets 51, the brackets being secured by long screws 52 receivable in the top member 30 of the housing 12. The solenoid magnet 50 provides a sleeve 53 extending axially the entire length thereof and having a plug at one end and being open at the other. Movable within the sleeve 53 is a cylindrical, slidable magnetic core or plunger 54 responsive to the energizing of the solenoid 50. Biasing the plunger 54 away from the solenoid is a spring 55 loaded between the solenoid 50 and a square plunger bracket 56 secured to the end of the plunger 54 and having a vertical pin means 57 mounted thereon.

A solenoid provided with a movable magnetic core serves as a very convenient means of causing an electric current to produce a direct mechanical action. However, the type of mechanical action to be produced and the efficiency with which it is produced are dependent upon the linkage between the movable magnetic core and the element doing the mechanical work. Connected between the pin means 57 of the plunger bracket 56 and the cam flange 43 of the valve support member 36 is a unique linkage arrangement including a lever arm 58, partially U-shaped in cross section, mounted on the pin means 57 and pivotally actuable therewith, a sealed drive shaft 60 rotatable within a cylindrical jacket 61 and having the lever arm 58 rigidly secured to its lower end 62 which extends below the jacket 61 and radially outwardly thereof, and a torque arm 63 located within the valve chamber 13 and rigidly connected to the drive shaft 60 which extends vertically upwardly through a tapered opening 64 in the top member 30. The torque arm 63 provides, at an intermediate point therealong, a cam engagement pin 65 and, at the end thereof, another cam engagement pin with a roller 66 thereon. The pin 65 engages the initial movement portion 44 of the cam flange 43 and the roller 66 engages the secondary movement portion 46 and the retractive portion 48.

The jacket 61 has a knurled collar 68 for frictionally engaging the tapered opening 64 and a circumferential shoulder 69 for abutting the top member 30, the jacket being pressed into the opening 64. The edge of the opening is staked about the jacket at 61a to provide a seal. A rubber washer 70 and another washer 70a of a plastic such as Teflon, are positioned between the jacket 61 and the lower end 62 of the drive shaft 60 as a seal. The washer 70a provides a relatively frictionless bearing surface and the washer 70 is compressed to compensate for irregularities in the jacket and shaft. Extending from the lower end 62 of the drive shaft 60 and through the lever arm 58 is a rectangular boss 72 having a recess therein for receiving a spherical bearing 73 located axially of the shaft 60 and about which it pivots. Exerting an upward force on the bearing 73 and acting to seal the shaft 60 within the jacket 61 is a leaf spring 74 of tempered ribbon steel. The spring 74 is mounted between one of the L-shaped brackets 51 and a lug 75 protruding from the side wall 33 of the housing 12, one end of the spring being bent away and inwardly therefrom to engage the bearing 73.

Secured to the operator housing 12 by screws 76 is a bottom wall 78 having terminals 80 mounted therein, the terminals being surrounded by three layers of insulation 81 and a rubber washer 82. Lead wires 84 from the coil of the solenoid 50 are connected to the terminals 80, the terminals extending from the interior to the exterior of the operator housing 12. About the inside of the bottom wall 78 and spaced inwardly from the periphery thereof is an upwardly extending flange member 86 engageable with the inside of the side and end walls 32 and 33, respectively, and about which fits a gasket 88 to insure proper sealing.

The sealed operator housing 12 is substantially filled with oil 90 completely immersing the solenoid magnet 50 and the movable plunger 54. The overall effect of a lubricant, such as oil, within the housing 12 is to reduce the frictional wear on the movable plunger 54 and the portion of the linkage arrangement contained in the housing 12. Excessive heat generated in the coil of the solenoid 50 will be dissipated rapidly as the surrounding oil medium will transmit it to the walls of the housing. In addition, the viscous nature of the oil 90 will reduce the impact force of the plunger 54 when reaching its end positions as a result of the energizing or de-energizing of the solenoid, and any noise that does result from such impact would, for the most part, be absorbed by the oil.

When the solenoid magnet 50 is energized through the lead wires 84, the plunger 54 is retracted against the biasing force of the spring 55. The movement of the plunger 54 into the solenoid 50 in response to the applied electric current results in the movement of the lever arm 58 through its engagement with the pin means 57. The movement of the lever arm 58 results in rotation of the drive shaft 60 sealed within the jacket 61. The rotating drive shaft 60 turns the torque arm 63 which provides the cam engagement pin 65 and the cam engagement roller 66. The cam engagement pin 65, being located at an intermediate point along the torque arm, engages the initial movement portion 44 of the cam flange 43, causing the support member 36 to pivot about the post 34 and therefore crack the seal between the valve member 20 and the valve seat 18. This initial force provided by the co-operation of the cam engagement pin 65 and the initial movement portion 44 must be sufficient to overcome frictional and gravitational forces on the moving parts, the pressure exerted on the backside of the valve member 20 by the controlled gaseous fuel, and the impedance offered the moving linkage within the operator housing 12 by the surrounding oil medium 90. Once the initial force has overcome the opposition of the static forces and the valve member 20 has been displaced from its seat, the pressure within the valve chamber 13 is reduced and a secondary force is applied transmitting less torque to the support member 36.

The valve member 20 having been displaced from the valve seat 18, the cam engagement roller 66 now engages the secondary movement portion 46 of the cam flange 43 at a point spaced radially closer to the pivot point than the post 34 of the support member 36 (see FIG. 7). Responding to the rotation of the drive shaft 60, the cam engagement roller 66 urges the cam flange 43 away from the valve seat 18 until the stop arm 40 of the support member 36 abuts the stub member 41, whereupon the valve member is in its wide open position (see FIG. 7).

When the solenoid 50 is de-energized at a later time the plunger 54 is urged out of the solenoid by the biasing spring 55. This action is transmitted through the previously described linkage arrangement to the cam engagement roller 66. The cam engagement roller 66, now being returned to its static valve-closing position, engages the opposed retractive portion 48 of the cam flange 43, thereby driving the valve support member 36 toward a closed position. This motion is further enhanced by the pressure of the fluid on the closing valve member 20 as it enters and impedes the direct fluid flow within the chamber 13.

Alternative forms of the cam flange 43 are exhibited in FIGS. 10 and 11, wherein like parts are identified by the same reference numbers as in FIGS. 1–9. A torque arm 63 is exhibited as having a cam engagement pin 65 and a cam engagement roller 66. A post 34 is shown as having a valve support member 36 pivotally mounted thereon and providing a valve member 20 shown in phantom lines. Formed integrally with the support member 36 and extending transversely thereto is a cam flange 143 having a cam surface including an initial movement portion 144 of short length and engageable with the cam engagement pin 65 of the torque arm 63, and a slotted portion 140 providing a secondary movement portion 146 on one side and a retractive portion 148 on the other side of the slot. The cam engagement roller 66 rides within the slotted portion 140. Upon rotation of the drive shaft (not shown) the torque arm 63 through the cam engagement pin 65 and the cam engagement roller 66 imparts pivotal movement to the cam flange 143 of the support member 36. The pin 65 first engages the initial movement portion 144 to break the sealing force and displace the valve member from the valve seat, the roller 66 then takes over engaging the secondary movement portion 146 and moves the valve to a wide-open position. When the torque arm 63 reverses direction as a result of the de-energizing of the solenoid, the roller 66 engages the retractive portion 148 and exerts a closing force thereon, thereby urging the valve support member 36 in the direction of the valve seat.

Although I have disclosed an exemplary embodiment of the invention, it will be understood that various changes, modifications and substitutions may be incorporated in such embodiment, and that various individual features of the invention may be utilized in other different embodiments, all without departing from the spirit of the invention as defined by the claims hereinafter appearing.

I claim as my invention:

1. In a device for controlling fluid flow, the combination of: a valve body having a valve chamber therewithin; a valve means movable within said valve chamber for controlling fluid flow therethrough; an enclosed housing secured to, and sealed from, said valve body; an electromagnet mounted within said housing and having a core piece movable within said housing; a lever arm connected to said core piece; a cylindrical jacket extending from said valve chamber into said housing; a rotatable drive shaft sealed within said jacket, said drive shaft being actuable by said lever arm; a torque arm rigidly secured to said drive shaft within said valve chamber and providing spaced first and second cam engagement pins; a cam flange extending from said valve means and providing a pair of spaced cam surfaces engageable with the respective pins of said torque arm; and an oil medium disposed in said housing, with said electromagnet and said core piece immersed in said oil.

2. In a device for controlling fluid flow, the combination of: a valve body having a valve chamber therewithin; a valve means movable within said valve chamber for controlling fluid flow therethrough; an enclosed housing secured to, and sealed from, said valve body; a cylindrical jacket extending from said valve chamber into said housing; a drive shaft rotatable within said jacket, said drive shaft having a radially extending flange for sealing engagement with said jacket and having a downwardly directed bearing surface; a leaf spring carried by said housing and engaging said bearing surface for urging said flange into engagement with said jacket; means coupling said shaft to said valve means; and means carried in said housing for rotating said shaft and controlling the position of said valve means.

3. In a device for controlling fluid flow, the combination of: a valve body having a valve chamber therewithin; a valve means movable within said valve chamber for controlling fluid flow therethrough; a valve actuator means carried on said valve body and having a member providing a translating motion; a lever arm connected to said translating member; a rotatable drive shaft carried in said valve body and being actuable by said lever arm; a torque arm rigidly secured to said drive shaft within said valve chamber and providing spaced first and second cam engagement pins; and a cam flange extending from said valve means and providing a cam surface having an initial movement portion engageable with said second cam engagement pin of said torque arm and having a secondary movement portion and a retractive portion engageable with said first cam engagement pin and said cam flange being rotatable about a fixed pivot point in a direction opposite to the path of travel of said torque arm.

4. A fluid control device as described in claim 3, wherein said valve actuator means is carried in an enclosed housing and is immersed in an oil medium carried in said housing.

5. In a valve mechanism, the combination of: a valve body having a flow passage therethrough and a valve seat transverse to said flow passage; a valve for sealing engagement with said valve seat; a first arm carrying said valve and movable about a first pivot point between valve open and valve closed positions, said first arm having a first cam surface adjacent said first pivot point, a second cam surface remote from said first pivot point, and a third cam surface facing said first cam surface; a second arm movable about a second pivot point in a direction opposite to that of said first arm, said second arm having a first cam remote from said second pivot point and a second cam adjacent said second pivot point; and means for rotating said second arm with said first cam engageable with said third cam surface when said valve is in said closed position and with said second cam engageable with said second cam surface to move said valve from said closed position and to engage said first cam with said first cam surface as said second arm is rotated and with said first cam engageable with said first cam surface to move said second cam surface out of engagement with said second cam and move said valve to said open position as said second arm is further rotated.

6. In a valve mechanism, the combination of: a valve body having a flow passage therethrough and a valve seat transverse to said flow passage; a valve for sealing engagement with said valve seat; a first arm carrying said valve and movable about a first fixed pivot point between valve open and valve closed position, said first arm having a first cam surface adjacent said first pivot point, a second cam surface remote from said first pivot point, and a third cam surface facing said first cam surface; a second arm movable about a second fixed pivot point, said second arm having a first cam remote from said second pivot point and a second cam adjacent said second pivot point; means for rotating said second arm in one direction, with said first cam engageable with said third cam surface when said valve is in said closed position and with said second cam engageable with said second cam surface to move said valve in a counter direction from the direction of travel of said second arm and from said closed position and to engage said first cam with said first cam surface as said second arm is rotated and with said first cam engageable wtih said first cam surface to move said second cam surface out of engagement with said second cam and move said valve to said open position as said second arm is further rotated; and spring means for urging said second arm in the opposite direction to engage said first cam with said third cam surface and move said valve to said closed position.

7. In a valve mechanism, the combination of: a valve body having a flow passage therethrough and a valve seat transverse to said flow passage; a valve for sealing engagement with said valve seat; a first arm carrying said valve and movable about a first fixed pivot point on one side of said seat between valve open and valve closed positions, said first arm having a first cam surface adjacent said first pivot point, a second cam surface remote from said first pivot point, and a third cam surface between said first cam surface and said first pivot point; a second arm movable about a second fixed pivot point on the opposite side of said seat, said second arm having a first cam remote from said second pivot point and a second cam adjacent said second pivot point; and means for rotating said second arm in one direction, with said first cam engageable with said third cam surface when said valve is in said closed position and with said second cam engageable with said second cam surface to move said valve in a counter direction from the direction of travel of said second arm and from said closed position and to engage said first cam with said first cam surface as said second arm is rotated and with said first cam engageable with said first cam surface to move said second cam surface out of engagement with said second cam and move said valve to said open position as said second arm is further rotated.

8. In a device for controlling fluid flow, the combination of: a valve body having a valve chamber therewithin, said valve chamber having an inlet port and an opposed outlet port, and said valve chamber including partially arcuate side walls defining a flow passage leading from said inlet port to direct said fluid in a curved flow pattern while passing through said valve chamber toward said outlet port; a valve means movable within said valve chamber and engageable with said outlet port transverse to said fluid flow for controlling such fluid flow therethrough; an electromagnetic operator housing secured to said valve body; a solenoid magnet mounted within said operator housing; a slidable magnetic core axially movable within said solenoid magnet upon energization thereof; and a linkage means for connecting said slidable magnetic core and said movable valve means within said valve chamber, and for positioning said valve means at an angle of 45° with respect to a line passing through the respective axes of said inlet port and said outlet port when said valve means is in its open position.

9. In a device for controlling fluid flow, the combination of: a valve body having a flow passage therethrough and a valve seat transverse to said flow passage; a valve for sealing engagement with said valve seat; a first arm carrying said valve and movable about a first fixed pivot point between valve open and valve closed positions, said first arm having a first cam surface adjacent said first pivot point, a second cam surface remote from said first pivot point, and a third cam surface facing said first cam surface; a second arm movable about a second fixed pivot point, said second arm having a first cam remote from said second pivot point and a second cam adjacent said second pivot point; means for rotating said second arm wtih said second cam engageable with said second cam surface of said first arm to impart a greater force at a point remote from the pivot point of said first arm in order to rotate said first arm at low speed and under high power to move said valve from said closed position, and with continued rotation of said second arm to engage said first cam with said first cam surface of said first arm thereby moving said second cam surface out of engagement with said second cam and rotate said valve to said open position at high speed and under low power; and a spring means for urging said second arm in the opposite direction to engage said first cam with said third cam surface and move said valve to said closed position.

10. In a device for controlling fluid flow, the combination of: a valve body having a flow passage therethrough and a valve seat transverse to said flow passage; a valve for sealing engagement with said valve seat; a first arm carrying said valve and movable about a first fixed pivot point between valve open and valve closed positions, said first arm having a first cam surface adjacent said first pivot point, a second cam surface remote from said first pivot point, and a third cam surface facing said first cam surface; a second arm movable about a second fixed pivot point, said second arm having a first cam remote from said second pivot point, said first cam including a rigid pin having an axially mounted roller rotatably positioned thereon, and a second cam adjacent said second pivot point; means for rotating said second arm with said second cam engageable with said second cam surface of said first arm to impart a greater force at a point remote from the pivot point of said first arm in order to rotate said first arm at low speed and under high power to move said valve from said closed position, and with continued rotation of said second arm to engage said first cam with said first cam surface of said first arm thereby moving said second cam surface out of engagement with said second cam and rotate said valve to said open position at high speed and under low power; and a spring means for urging said second arm in the opposite direction to engage said first cam with said third cam surface and move said valve to said closed position.

11. A fluid control device as described in claim 10, including: an enclosed housing secured to, and sealed from, said valve body; a cylindrical jacket extending from within said valve body into said housing; a drive shaft rotatable within said jacket, said drive shaft having a radially extending flange for sealing engagement with said jacket and having a downwardly directed bearing surface; a leaf spring carried by said housing and engaging said bearing surface for urging said flange into engagement with said jacket; means coupling said shaft to said second arm; an electromagnet mounted within said housing and having a core piece movable within said housing; a lever arm connecting said core piece and said drive shaft; and an oil medium disposed in said housing, with said electromagnet and said core piece immersed in oil.

References Cited in the file of this patent

UNITED STATES PATENTS

| | | |
|---|---|---|
| 555,738 | Rushton | Mar. 3, 1896 |
| 1,688,686 | Carlson | Oct. 23, 1928 |
| 1,923,681 | McCabe | Aug. 22, 1933 |
| 2,159,405 | Schubert | May 23, 1939 |
| 2,649,815 | Kaye | Aug. 25, 1953 |
| 2,687,274 | Bydalek | Aug. 24, 1954 |
| 2,923,520 | Ray | Feb. 2, 1960 |
| 2,931,617 | Jamieson | Apr. 5, 1960 |